United States Patent [19]
Kirkland et al.

[11] 3,795,313
[45] Mar. 5, 1974

[54] CHROMATOGRAPHIC PACKING WITH CHEMICALLY BONDED ORGANIC STATIONARY PHASES

[75] Inventors: Joseph J. Kirkland; Paul C. Yates, both of Wilmington, Del.

[73] Assignee: E. I. du Pont de Nemours and Company, Wilmington, Del.

[22] Filed: Oct. 25, 1972

[21] Appl. No.: 300,863

Related U.S. Application Data

[62] Division of Ser. No. 39,665, May 22, 1970, Pat. No. 3,722,181.

[52] U.S. Cl............... 210/198 C, 55/386, 210/502, 252/431
[51] Int. Cl........................................... B01d 15/08
[58] Field of Search........ 252/431; 55/67, 197, 386; 73/23.1; 210/31 C, 198 C

[56] References Cited
UNITED STATES PATENTS
3,500,616   3/1970   Bossaat................................ 55/386

*Primary Examiner*—John Adee

[57] ABSTRACT

A process for making a chromatographic packing having a polymeric stationary phase in which molecules having the formula

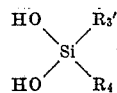

wherein $R_3'$ is a hydroxyl, or an aliphatic or aromatic hydrocarbon monovalent radical, and $R_4$ is a monovalent aliphatic or aromatic hydrocarbon radical, are partially prepolymerized, chemically bonded to a polyvalent metal-containing substrate, the metal having a valence of 3–5, and futher polymerized.

The polymeric stationary phase has a repeating unit of the formula

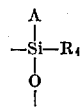

wherein A is -O- or a monovalent aliphatic or aromatic hydrocarbon radical, and is chemically bonded to the surface of the substrate by an

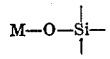

linkage, where silicon is part of a repeating unit.

26 Claims, 12 Drawing Figures

CHROMATOGRAPHIC PACKING WITH CHEMICALLY BONDED ORGANIC STATIONARY PHASES

This is a division of U.S. Pat. application Ser. No. 39,665, filed May 22, 1970, now U.S. Pat. No. 3,722,181.

BACKGROUND OF THE INVENTION

This invention relates to improved chromatographic packings in which organosilanes are chemically bonded to a substrate and polymerized to form a stationary organic phase.

A previous attempt to chemically bond a stationary phase to a substrate involved the esterification of siliceous chromatographic supports with alcohols. However, the resulting Si - O - C linkage was hydrolytically unstable and the product consisted of monomolecular films that only allow adsorptive, but not partition, interactions with the solute.

Further, polymolecular silicones have been reacted to chromatographic supports by employing two series of steps. In the first series, dimethyldichlorosilane or methyltrichlorosilane is bonded to the silica substrate. In the second series, organochlorosilanes are attached to the above methylchlorosilanes. Due to the use of highly reactive chlorosilanes in both series of steps, the extent of reaction in each series is difficult to control, which usually results in films of variable thickness. In addition, the first series of steps places methyl groups on the substrate surface which reduces the effective polarity of the packing. This clearly represents a detriment when polarity is desired. Additionally, the second series of steps does not permit the use of volatile organochlorosilanes, thus restricting the choice of resultant stationary phases. Further, the particular organochlorosilanes that would be required as starting reagents to place certain functional (e.g. amino) groups on the surface would be self-reactive and thus self-destructive. Lastly, it was necessary, to deactivate the remaining active surface sites before chromatographic use. Deactivation leaves a silicate ester which has sufficient thermal and hydrolytic unstability to cause "bleed" at the higher temperatures used in gas chromatography.

Chemical bonding of silanes as "coupling agents" to silica-containing surfaces is known in the prior art where the surface is contacted with an aqueous solution of the coupling agent, and the water removed. The resulting bonded layer lacks porosity, has uncontrollable thickness, and hence, is unsuitable for chromatography, which must have both to allow for precise diffusion of the substances being chromatographed.

Thus it is an object of this invention to provide a chromatographic packing with an organic stationary phase chemically bonded directly to a silica-containing substrate with a bond that is hydrolytically and thermally stable.

It is a further object to provide a process for producing such a packing wherein the thickness and porosity of the resulting chemically-bonded stationary phase are controllable.

SUMMARY OF THE INVENTION

These and other objects are accomplished by prepolymerizing hydroxysilane reagents in the presence of a strictly limited quantity of water. After prepolymerization, the silane reagent is reacted to the surface of the substrate, and further polymerized to form the chemically-bonded stationary phase. The silane reagent molecules have the general formula wherein $R_3'$ is a hydroxyl or a monovalent aliphatic or aromatic hydrocarbon radical, and $R_4$ is a monovalent aliphatic or aromatic hydrocarbon. $R_3'$ or $R_4$ may contain atoms other than carbon and hydrogen. The bonded polymolecular stationary phase has a repeating unit with the formula wherein A is a monovalent aliphatic or aromatic hydrocarbon radical. The stationary phase is bonded to the polyvalent metal-containing substrate surface through an linkage, where M is the metal and is part of a repeating unit.

By choice of $R_4$ and (when not a hydroxyl) $R_3'$, the chemically-bonded stationary phase may be produced with a variety of functional groups, resulting in chromatographic packing with widely diverse selectivity. The resulting packings may vary from extremely polar to non-polar according to the needs of the particular separation to be performed.

The thickness of the resulting stationary phase is controlled by controlling the quantities of starting materials. Thus, bonded stationary phase may be deposited that is controllably monomolecularly or polymolecularly thick. In particular, a polymolecular layer of predetermined thickness, which will allow for precise diffusions, may be bonded to the substrate.

Mixtures of the above starting compounds may be reacted to the surface and copolymerized to give "blends" for particular purposes. The compositions of these blends are determined by controlling the concentrations of initial reactants.

A particularly useful type of blend is one by which the degree of cross-linking in the bonded and polymerized stationary phase can be controlled. Greater concentrations of starting reagents in which $R_3'$ is a hydroxyl result in higher degrees of cross-linking, which is particularly useful for gas chromatography (hereinafter referred to as G.C.). On the other hand, greater concentrations of compounds with $R_3'$ being nonhydroxyl result in less cross-linking which is desired for liquid chromatography (hereinafter referred to as L.C.). The extreme degrees of cross-linking are obtained by using either one of these (hydroxyl or nonhydroxyl) alone.

The use in L.C. of packings with the chemically-bonded stationary phase eliminates the necessity for precolumns or presaturating the carrier with the stationary phase. Further, high column efficiencies are maintained because of the homogeneous distribution of the stationary phase on the surface of the supports. This bonded stationary phase provides greater column stability and eliminates many problems associated with the loss of partitioning liquid during the operation of conventional liquid - liquid chromatographic columns.

G.C. substrates with the chemically bound liquid stationary phase show very low vapor pressure. Thus column life is extended and the level of "noise" in the detection system due to stationary phase "bleed" is minimal. These packings also show very high thermal stability as preferred for G.C.

DETAILED DESCRIPTION OF THE INVENTION

Chromatographic packings may be prepared having chemically-bonded organic stationary phases with a variety of functional groups, resulting in widely diverse chromatographic selectivity. Bonded-phase packings may be prepared for gas and liquid chromatography on a variety of substrates. The composition of the substrate is not critical, except that its surface must be capable of chemically reacting with silanols. Silica containing substrates are preferred, although any polyvalent metal-containing substrate may be used where the valence of the metal is from three through five. Examples of useful substrates include diatomaceous earths, silica gel, glasses, sand, alumino-silicates, quartz, porous silica beads, and clays. Additionally, non-alkaline metal oxides, alumina, thoria, titania, zirconia, and non-alkaline metals with an oxide skin may be utilized.

When the substrate is in the form of a support (i.e., particulate), the shape of the particles is not critical. Examples of shapes include rings, polyhedra, saddles, platelets, fibers, hollow tubes, rods, or cylinders. Spherical supports are preferred because of their regular and reproducible packing characteristics and ease and convenience in handling.

Figure 1:
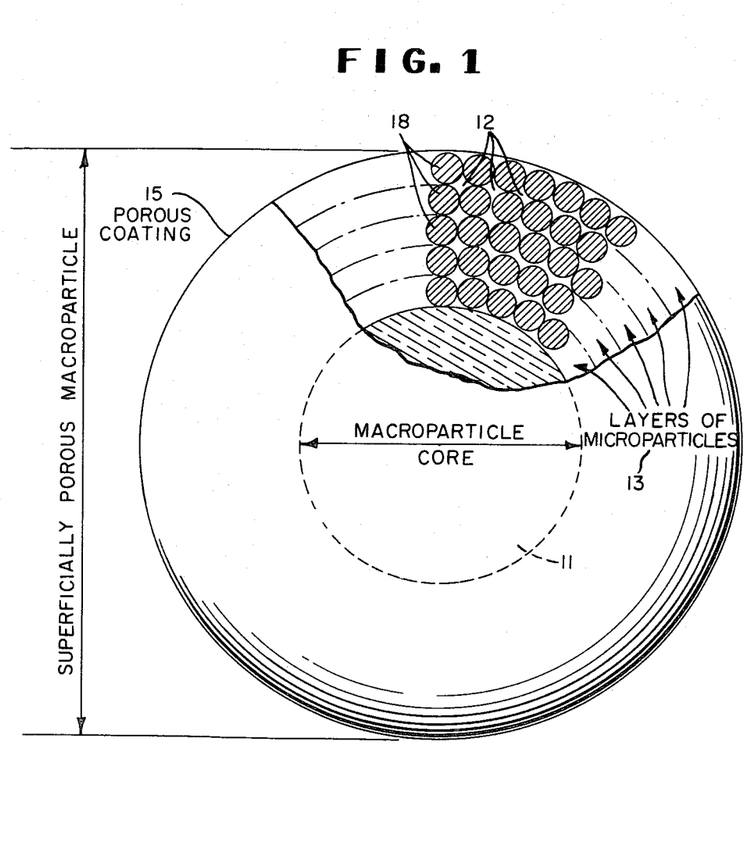
FIG. 1 is a diagrammatical representation of a cross-section of a preferred chromatographic support material.

The controlled surface porosity, support of FIG. 1 (described in U.S. Pat. No. 3,505,785 and sold under the trade name "Zipax" by E. I. du Pont de Nemours and Company, Wilmington, Delaware) is a preferred embodiment of a support structure. It has an impervious core 11, preferably of glass or other ceramic material and a porous coating 15 made up of sequentially adsorbed monolayers 13 of microparticles. It consists of discrete spherical particles having a large number of superficial shallow pores 12 and no deep pores. It has regular and reproducible packing characteristics, ease and convenience in handling, and desirable characteristics for high-speed, high-efficiency gas and liquid chromatography.

In discussing substrates, the terms "surface," "surface area," "available surface," etc. refer to all surfaces which are accessible from the exterior of the substrate. In FIG. 1, for example, the surfaces within the pores 12 would be included in these terms.

It is often desirable for the support or substrate surface to have a high initial population of metal-hydroxy, or preferably -SiOH groups. This is best accomplished by treating the surface with acid or base. The preferred procedure is to heat the support with concentrated nitric or hydrochloric acid on a steam bath for several hours. Excess acid or base should be removed from the surface by thorough washing before the support is dried for reaction with the silane reagents.

The reagents employed to produce the chemically-bonded organic stationary phase are silanols having the formula where $R_3'$ and $R_4$ are given above. They are preferably prepared from silicate esters with the formula where $R_1$ and $R_2$ are alkoxy, $R_3$ is alkoxy or $R_3'$, and $R_4$ is given above.

A list of commercially-available reagents is shown in Table I. Table II gives other reagents which are not presently known to be commercially available. Their structures encompass a variety of configurations. These may be synthesized according to the general techniques contained in Chemistry of the Silicones, by R. G. Rochow, John Wiley & Sons, New York, 2nd Ed. 1951.

TABLE I

| Reagent | Formula |
|---|---|
| γ-glycidoxypropyltrimethoxysilane [a,b] | CH$_2$—CH—CH—O$_3$—(CH$_2$)$_3$Si(OCH$_3$)$_3$ (epoxy group) |
| β-(3,4-epoxycyclohexyl)-ethyltrimethoxysilane [a] | epoxycyclohexyl—(CH$_2$)$_2$Si(OCH$_3$)$_3$ |
| γ-Mercaptopropyltrimethoxysilane [a] | HS(CH$_2$)$_3$Si(OCH$_3$)$_3$ |
| γ-Aminopropyltriethoxysilane [a,c] | NH$_2$(CH$_2$)$_3$Si(OC$_2$H$_5$)$_3$ |
| N-β-(aminoethyl)-γ-aminopropyltrimethoxysilane [a,b] | NH$_2$(CH$_2$)$_2$NH(CH$_2$)$_3$Si(OCH$_3$)$_3$ |
| [N-β-(aminoethyl)-γ-amino-(2-methyl)propyl]-methyldimethoxysilane [b] | H$_2$N(CH$_2$)$_2$HNCH$_2$CH(CH$_3$)CH$_2$—Si(OCH$_3$)$_2$ with CH$_3$ |
| γ-Methacryloxypropyltrimethoxysilane [a,b] | CH$_2$CCH$_3$COO(CH$_2$)$_3$Si(OCH$_3$)$_3$ |
| Vinyl-tris(2-methoxyethoxy)-silane [a] | C$_2$H$_3$Si(OC$_2$H$_4$OCH$_3$)$_3$ |
| Dimethyldiethoxysilane [a,c] | (CH$_3$)$_2$Si(OC$_2$H$_5$)$_2$ |
| Methyltriethoxysilane [a,c] | CH$_3$Si(OC$_2$H$_5$)$_3$ |
| Phenyltriethoxysilane [a,c] | C$_6$H$_5$Si(OC$_2$H$_5$)$_3$ |
| Vinyltriethoxysilane [a,c] | C$_2$H$_3$Si(OC$_2$H$_5$)$_3$ |
| Amyltriethoxysilane [a] | C$_5$H$_{11}$Si(OC$_2$H$_5$)$_3$ |
| Ethyltriethoxysilane [a] | C$_2$H$_5$Si(OC$_2$H$_5$)$_3$ |
| Methyltrimethoxysilane [b] | CH$_3$Si(OCH$_3$)$_3$ |
| Phenyltrimethoxysilane [b] | C$_6$H$_5$Si(OCH$_3$)$_3$ |
| Diphenyldiethoxysilane [b] | (C$_6$H$_5$)$_2$Si(OC$_2$H$_5$)$_2$ |
| Vinyl-tris-(acetyl)silane [b] | CH$_2$=CHSi(OOCCH$_3$)$_3$ |
| 3-chloropropyl-trimethoxysilane [b] | Cl(CH$_2$)$_3$Si(OCH$_3$)$_3$ |
| N-(N-methoxycarbonylmethyl-β-ethylamino) γ-aminopropyltrimethoxysilane [b] | CH$_3$OOCCH$_2$CH$_2$NH(CH$_2$)$_2$NH(CH$_2$)$_3$—Si(OCH$_3$)$_3$ |
| β-Cyanoethyl-triethoxysilane [c] | CH(CH$_2$)$_2$Si(OCH$_2$H$_5$)$_3$ |
| β-Cyanoethyl-methyldiethoxysilane [c] | CH(CH$_2$)$_2$Si—(OC$_2$H$_5$)$_2$ with CH$_3$ |

[a] Available from Union Carbide Corporation, 270 Park Avenue, New York, N.Y. 10017.
[b] Available from Dow-Corning Corporation, Midland, Michigan.
[c] Available from General Electric, Silicone Products Department, Waterford, New York, 12188.

TABLE II

| Reagent | Formula |
|---|---|
| γ-(Aminocarbonyl)propyl-triethoxysilane | H$_2$NOC—(CH$_2$)$_3$—Si(OC$_2$H$_5$)$_3$ |
| β-Nitroethyl-triethoxysilane | O$_2$N—CH$_2$CH$_2$—Si(OC$_2$H$_5$)$_3$ |
| (α, γ-Dihydroxypropyl)-methyldimethoxysilane | HOCH—CH$_2$—CH(OH)—Si(OCH$_3$)$_2$ with CH$_3$ |
| Methylsulfinylmethyl-triethoxysilane | CH$_3$—SO—CH$_2$—Si(OC$_2$H$_5$)$_3$ |
| Perfluoropropyl-trimethoxysilane | F$_3$C—CF$_2$—CF$_2$—Si(OCH$_3$)$_3$ |
| p-Sulfamoylphenyl-methyldimethoxysilane | NH$_2$SO$_2$—C$_6$H$_4$—Si(OCH$_3$)$_2$ with CH$_3$ |
| p-(Methoxycarbonyl)phenyltrimethoxysilane | CH$_3$OOC—C$_6$H$_4$—Si(OCH$_3$)$_3$ |
| L-(+)-p-[5-methoxycarbonyl)-5-aminopent-1-yl-sulfamoyl]-phenyltrimethoxysilane | CH$_3$OOCCH(NH$_2$)(CH$_2$)$_4$NHSO$_2$C$_6$H$_4$—Si(OCH$_3$)$_3$ |
| Methylsulfonylmethyl-triethoxysilane | CH$_3$—SO$_2$—CH$_2$—Si(OC$_2$H$_5$)$_3$ |

A silicate ester, when used as the reagent, must first be hydrolyzed to the silanol which then engages in prepolymerization, reaction with the substrate surface, and subsequent polymerization. Factors which affect this hydrolysis include:

1. high or low pH (bases or acids),
2. presence of soluble salts of certain metals such as copper, lead, zinc, and iron, and
3. temperature.

In general, the silane ester (except for aminosilanes), is hydrolyzed under acidic conditions preferably at elevated temperatures. For the subsequent prepolymerization, the hydrolysis is preferably carried out by refluxing the reagent in a non-aqueous solvent containing several molar excesses of water with an acid catalyst. The solvent in addition to having some solubility for water should be non-reactive with the reagent water or the (acid or base) catalyst. It should boil in the range of about 25° C. to 300° C., preferably 50° C. to 200° C. Ethers such as tetrahydrofuran and dioxane have worked satisfactorily.

The amount of water added to the non-aqueous solvent for the hydrolysis should be at least one-third of the equivalent of the silane reagent and need not be more than about a 100-fold equivalent excess. One equivalent to a 50-fold equivalent excess generally suffices. A very large excess of water inhibits the subsequent partial polymerization. The hydrolysis is normally run at elevated temperatures (preferably the boiling point of the non-aqueous solvent) for a period of about 30 minutes to several hours.

The operation is generally performed longer than required for hydrolysis, in order to effect partial polymerization. If necessary for the partial polymerization, the water content and pH of the solution may be adjusted, the latter to a value of from 3 through 6 by ammonia, acetic acid, or some other catalyst.

Partial polymerization of the silanes before reaction to the substrate is essential in producing a chemically-bonded stationary phase having the required thickness and porosity. Initiation of polymerization may be determined by placing a small amount of the silane-containing solution in water. The appearance of cloudiness indicates that the prepolymerization, having progressed to the point where at least part of the silane reagent is insoluble in water, is sufficient. Contrariwise, this prepolymerization should not progress so far as to appreciably increase the viscosity of the silane-containing solution.

The reaction of the prepolymerized silane to the substrate, followed by the final polymerization, is carried out at temperatures from about 50° C. to 350° C., a range of 100°–250° C. being preferred. Times required for this step vary from a few minutes to several hours, but usually 1–3 hours is adequate for the preferred temperature range.

Other procedures in which silane ester reagents may be prepolymerized and reacted to the chromatographic substrates include:

1. Preparing an acidic (pH 3 to 5) aqueous solution of the reagent whereby it hydrolyzes to the corresponding silanol compound. A suitable chromatographic substrate is soaked in the solution and excess liquid filtered off. The mixture is first heated to a temperature below 100° C. to initiate polymerization, and then further heated to carry out the reaction to the substrate surface and to complete polymerization to form the polymeric organic phase.

2. The silane ester reagent is deposited on the chromatographic substrate by evaporation from a suitable volatile solvent. The reagent is then hydrolyzed and prepolymerized by passing moist air or steam through the coated support. The reaction with the surface and polymerization is then carried out by heating.

3. The silicate ester reagent contained in a volatile unreactive solvent such as tetrahydrofuran is hydrolyzed and prepolymerized by adding aqueous hydrochloric acid and refluxing the mixture. The substrate is added to this solution. The volatile organic solvent is then removed by low temperature vacuum distillation. A large excess of toluene, xylene or other suitable solvent is added to the wet powder and the water-solvent azeotrope is continuously removed until the reaction and polymerization is complete.

4. Chemical means may be used to remove the water which is the driving force in these reactions. The addition of reagents that readily react with water, such as dimethoxypropane, will effect the desired prepolymerization, the reaction to the substrate surface, and the subsequent polymerization.

A final extraction step may be used to remove any silane not bonded to the substrate. The solvents used in this step should have some solubility for the unbonded polymer which insures that the polymer left on the substrate is indeed chemically-bonded thereto.

Mixtures of different types of silane molecules may also be used in the prepolymerization, reaction, and polymerization steps. In this manner, bonded stationary phases having "blends" of various properties suitable for particular separations may be developed.

A particularly useful type of "blend" is the one controlling the extent of cross-linking in the polymerization process. Packings for gas chromatography generally require a highly cross-linked structure, in order for the polymer to have optimum stability at high temperatures. Conversely, packings for liquid chromatography should have a less crosslinked polymeric phase. This lower order of crosslinking permits better penetration of the carrier, with subsequent improved accessibility of the solute into the solvated polymeric structure. The chemically-bonded stationary phases also possess unique chemical and physical properties because of their ability to swell in certain solvents and to form gelatinous, ordered structures which function as selective stationary gel phases.

The extent of the crosslinking reaction is controlled by adding dialkoxysilicates, to the usual trialkoxysilicate, $R-Si(OR')_3$, reagents. The addition of dialkoxysilicates to the reaction significantly reduces the crosslinking, since the other group ($R''$) attached to the silicon atom does not engage in the polymerization. The addition of the modifying functional group $R''$ also may impart desirable physical and chemical properties to the bonded phase.

As shown in the examples below, the reaction of the silicate reagents to the substrate surface proceeds very close to quantitatively. Thus, by controlling the initial amounts of reagents, it is possible to determine the thickness of the resulting film of chemically-bonded stationary phase upon the substrate surface. A monolayer film may be produced, for example, where it is desired to effect selective adsorption. However, in the usual partition chromatography, a substrate with a polymolecular layer is utilized.

Figures 2, 3, 4:
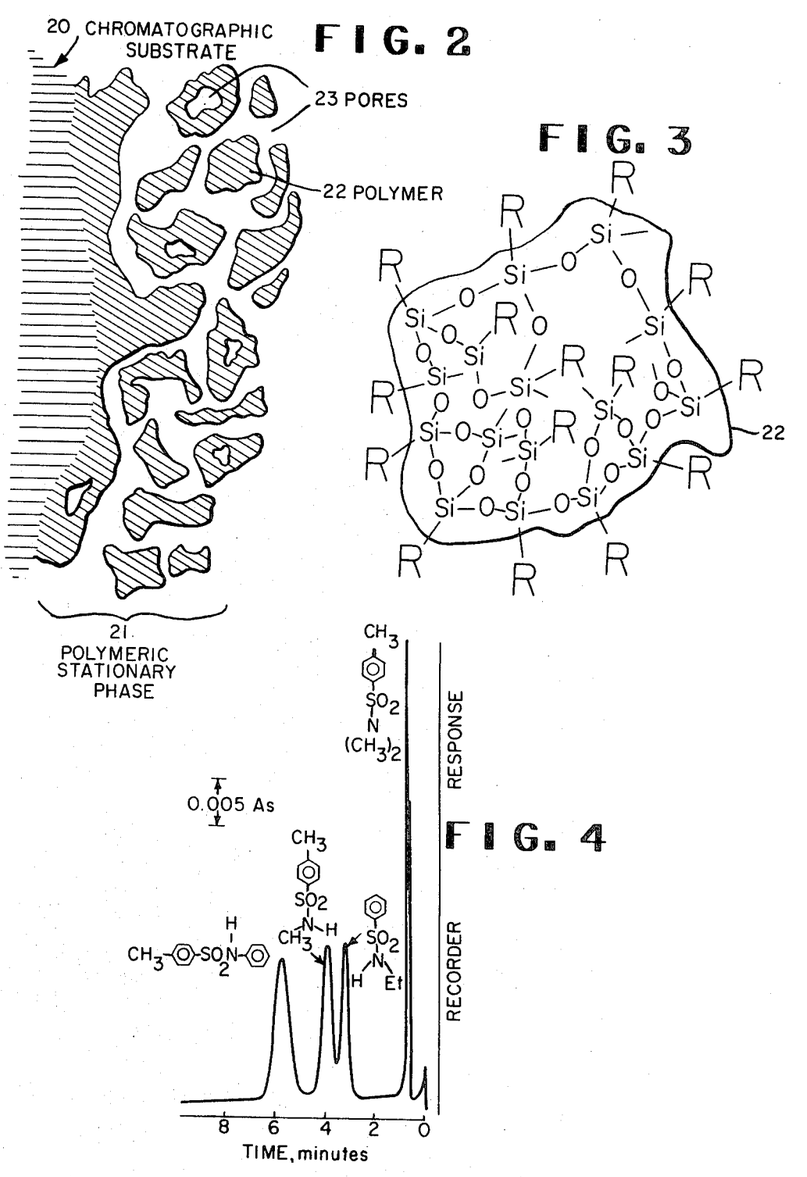
FIG. 2 is a schematic cross-section of a polymeric stationary phase chemically bonded to a substrate.
FIG. 3 shows the chemical structure of the polymeric stationary phase.
FIG. 4 is a part of the liquid chromatographic separation of sulfonamides using the present invention.

In the latter case the polymeric stationary phase is basically a three-dimensional porous network of repetitive, functional groups of the silane structure, chemically-bonded to the support surface by an linkage. A schematic cross-section representation of the porous polymer structure is shown in FIG. 2 where the substrate is indicated at 20, the chemically-bonded stationary phase at 21, a portion of polymer at 22, and the pores at 23. FIG. 3 gives an exploded schematic representation of the claimed structure of a piece of polymer 22.

This chemically-bonded organic phase should have an average thickness of 30 A° to 10,000 A°, with 50–2,000 A° being preferred. This preferred range encompasses sufficient thickness to ensure the desired chromatographic interactions without being so large (thick) so as to greatly affect column efficiency as a result of resistance to mass transfer of the solute within the polymeric phase. The bonded stationary phase should have about 20 to 95 percent of its volume consisting of pores, with a range of 35 to 75 percent preferred. The polymer should be sufficiently porous to allow penetration by the carrier phase and the sample components, while having sufficient cross-linking to ensure that the desired mechanical and chemical stability will be obtained.

Usually in chromatography, the substrate is a particulate support. These particles are coated with the stationary phase and packed into columns. In the present invention, this stationary phase is chemically bonded to the support particles, which are then packed into columns in the usual way. However, the present invention is also useful in other forms of chromatography. The stationary phase may be bonded to a substrate of silica gel. Also, where a capillary tube without a particulate support is used for the column, a stationary phase may be bonded directly onto the column wall itself.

The bonded-phase materials are also useful for "liquid-partition" thin layer chromatography. The procedure is to coat a suitable thin layer adsorbent, such as finely divided (5 to 10 microns) silica gel or diatomaceous earth with one of the bonded polymers. This chromatographically active material is coated in thin layers on plates in the usual manner. The plates are usually glass and flat, but other materials and shapes may be used. Mixtures of compounds are then spotted on these thin layer plates and developed, using the usual procedures for liquid-adsorption thin layer chromatography. This approach permits the thin layer chromatography of relatively insoluble compounds to be carried out with polar solvents in a liquid-liquid partitioning mode. The techniques of liquid-liquid thin layer chromatography are generally difficult, and chromatographic separations of sparingly soluble compounds by the liquid-liquid partition approach is generally impossible without the use of a chemically-bound stationary phase.

In liquid chromatography, use of packings with bonded stationary phases provides additional operational advantages over columns with conventional mechanically-held liquid phases. Peaks may be collected and the constituent readily isolated for further characterization by simply evaporating the volatile carrier system. This is possible because the sample is not contaminated by a less volatile stationary phase which is usually present in carrier-saturation amounts in a conventional liquid-liquid system. Further, it is practical to recycle the effluent from the detector back into the reservoir for further use, without any treatment, since the carrier need not be equilibrated with a stationary phase.

Packings with chemically-bound stationary phases are ideal for gradient elution and flow-programmed liquid chromatographic separations. The polarity and flowrate of the carrier solvent may be changed stepwise or continuously during a run without degrading the column. Thus, it is possible to chromatograph a sample having components with widely varying partition ratios in a single chromatographic run in a manner that assures that all of the sample constituents are eluted. "Regeneration" of the bonded-phase packing after a gradient elution run is accomplished rapidly.

EXAMPLE 1

Preparation of "Ether"/"Zipax" Packing for Liquid Chromatography 25 grams of <40 microns "Zipax" and 150 ml. of concentrated nitric acid are placed in a 250 ml. beaker and heated on a steam bath for 2 hours with occasional stirring. The resulting support is washed free of acid by repeatedly slurrying with distilled water. The material is then air-dried on a Buchner sintered glass vacuum filter and heated for 1 hour at 125° C. in a circulating air oven.

To a 100 ml. round bottom flask is added 25 ml. of fresh reagent grade tetrahydrofuran (Fisher Scientific Co.), 6.65 ml. of a 50 mg./ml. tetrahydrofuran solution of Dow Corning Z-6040 ($\gamma$-glycidoxypropyltrimethoxysilane) and 0.75 ml. of 0.01N hydrochloric acid. This mixture is refluxed gently under a condenser for 30 minutes. This hydrolysis mixture is then added to the 25 grams of acid-treated "Zipax" from above, contained in a shallow evaporating dish. The volatile solvent is removed while stirring the mixture under a slow stream of nitrogen. The resulting dry powder is then heated for 1 hour at 125° C. in a circulating air oven. When cooled, the mixture is then transferred to a 500 ml. round bottom flask containing 150 ml. of dioxane. This mixture is refluxed with gentle stirring for 30 minutes. The solvent is decanted from the support and 150 ml. of reagent grade methanol added to the flask. The resulting mixture is refluxed for 10 minutes. The solvent is then decanted, and another 150 ml. of absolute methanol added and again the mixture refluxed for 10 minutes. The solvent is decanted and the resulting support air dried on a sintered glass Buchner funnel. The support is then dried in a circulating air oven for 30 minutes at 125° C.

Elemental analysis of the resulting "ether" bonded-phase carried out on an F & M Scientific Co. Model 185 C, H & N analyzer showed 0.35, 0.33 percent carbon, and 0.062, 0.63 percent hydrogen. Assuming the reaction depicted below, elemental data show that 0.77 percent polymer was present on the "Zipax," representing 88 percent of theoretical.

Scanning electron micrographs of this bonded-phase material show no differences when compared with the starting uncoated "Zipax," indicating that the silane is reacted with the microparticle surface and that the resulting stationary phase does not obstruct the pores.

The porosity of the polymeric stationary phase itself is evidenced by surface area measurements made on "Zipax" coated with the following amounts of the "ether" bonded-phase.

| Material | Surf. Area, $m^2/g$. |
|---|---|
| Uncoated "Zipax" | 1.0 |
| 0.38% "ether" | 0.11 |
| 1.16% "ether" | 0.19 |
| 1.65% "ether" | 0.42 |

The rapid decrease in surface area when "Zipax" is coated with a small amount of polymer indicates that initially, the polymer reacts in the pores between the microparticles. The surface area then rises as the amount of polymer bonded to the support increases clearly showing that the bonded stationary phase is indeed porous. Also, the stationary phase is not extracted by boiling organic solvents which would normally have significant solubility for the polymer indicating that the polymer has actually reacted with the "Zipax" surface.

An illustrative chromatographic separation using this "ether"/"Zipax" bonded-phase packing is shown in FIG. 4. This mixture of aromatic sulfonamides was separated in about 6.5 minutes with a 1 meter × 2.1 mm i.d. column, using a carrier of 5 percent chloroform in hexane at 27° C., a flow of 2.66 cc./min., a column input pressure of 860 psi, and an ultraviolet detector sensitivity of 0.05 absorbance, full-scale. The apparatus employed was described in an article by Joseph J. Kirkland in Journal of Chromatograph Science 7, 7 (1969).

The "ether" bonded-phase column used to separate these sulfonamides is unaffected by the chloroform in the carrier. Had this separation been carried out with a conventional system, the polar solvent would have had appreciable solubility for the stationary liquid, necessitating presaturation of the carrier by the stationary phase and a pre-equilibrating column containing packing with the stationary phase. None of these precautions were required with a bonded-phase column.

The "ether" bonded-phase column demonstrates stability at high carrier velocities. The column was operated at a carrier linear velocity of 20.8 cm./sec. (column input pressure - 3,000 psi) with no apparent change in chromatographic properties in succeeding use. Conventional liquid-liquid chromatographic columns are maintained with extreme difficulty because the relatively high shear forces developed at these flow rates cause the loss of the stationary liquid phase from the packing.

Figure 5:
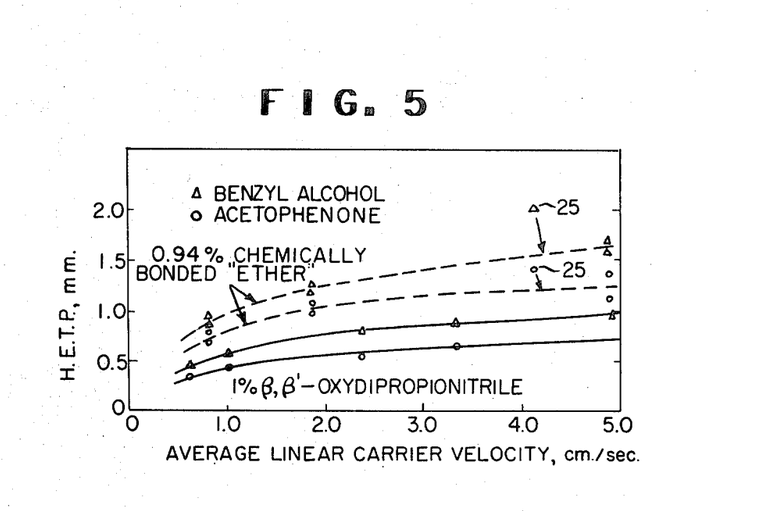
FIG. 5 compares liquid chromatographic HETP v. Carrier Velocity Plots of the present invention with the prior art.

The efficiency of the dry-packed "ether" bonded-phase column is nearly equivalent to that of comparable liquid-liquid chromatographic columns made with mechanically-held stationary phases. FIG. 5 shows comparative HETP (height equivalent to a theoretical plate) versus linear carrier velocity plots for two columns made from the same original 325–400 mesh "Zipax" supports. One column embodies mechanically-held 1% $\beta,\beta$-oxydipropionitrile as the stationary phase, while the other consists of a 0.94 percent "ether" bonded-phase. HETP data for the bonded-phase column is slightly higher than that for the conventional liquid-liquid column for two solutes of which acetophenone is essentially unretarded and benzyl alcohol is moderately retained.

After obtaining the original HETP data, the "ether" bonded-phase column was operated at input pressures up to 5,000 psi and carrier linear velocities up to 40 cm./sec. Even under these very drastic conditions, the column showed little degradation, as evidenced by the especially-marked points 25 in the FIG. 5 plot. Operation of conventional liquid-liquid chromatographic columns at carrier velocities of 40 cm./sec. is very difficult, because of the loss of mechanically-held stationary phase.

Figure 6:
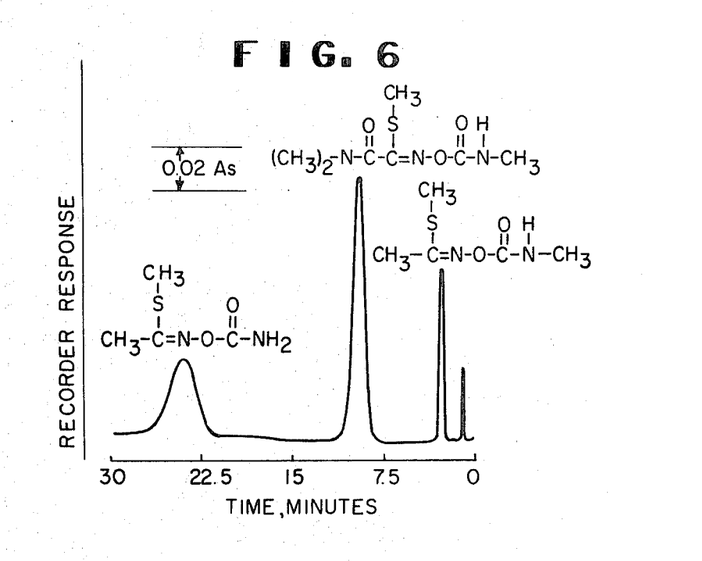
FIG. 6 is a plot of the liquid chromatographic separation of thiolhydroxamates using the present invention.

The uniqueness of the "ether" bonded-phase for liquid chromatographic separations is further illustrated in FIG. 6. This synthetic mixture of the thiolhydroxamates shown was separated in a 1 meter × 2.1 mm. i.d. column of the 325–400 mesh "Zipax" containing 0.94 percent "ether" bonded-phase, the column being operated at 27° C., with a carrier of 10 percent chloroform in hexane. These compounds are difficult to separate with conventional liquid-liquid chromatographic systems because of their polyfunctionality and their high polarity. They are strongly retained on most conventional stationary phases, and require a polar carrier to elute them in a resonable time. The solubility of the stationary phase in this rapidly moving polar carrier causes extreme difficulty in maintaining a column of constant performance. No such difficulties are experienced with the "ether" bonded-phase packing, and carriers having any desired polarity can be used to chromatograph highly polar compounds.

EXAMPLE 2

Preparation of "$\beta$-Cyanoethyl"/"Zypax"Bonded-Phase 25 milliliters of reagent grade dioxane (Special Services, Du Pont Experimental Station), 5.5 ml. of 70 mg./ml. General Electric XC-3711 ($\beta$-cyanoethyltriethoxysilane) in dioxane, and 2 ml. of 0.1N hydrochloric acid are combined in a 250 ml. round bottom flask and refluxed for one hour under a condenser. The resulting hydrolyzed mixture is poured onto 25 grams of <400 mesh "Zipax" (acid-washed as described above), and the solvent removed while continuously stirring under warm air from a heat gun. The resulting dry powder is heated for one hour at 150° C. in a circulating air oven. The treated material is transferred to a 500 ml. round-bottom flask and refluxed with 200 ml. of absolute methanol for 15 minutes. The slightly cloudy solvent is decanted and the support again refluxed with 200 ml. of fresh absolute methanol for 15 minutes. The clear solvent is decanted and the support again refluxed for 15 minutes with a fresh 200 ml. portion of absolute methanol. The clear solvent is decanted, the treated support air dried on a sintered glass Buchner filter funnel, and then heated in a circulating air oven for 30 minutes at 150° C.

By elemental analysis, the resulting bonded-phase showed 0.230, 0.232 percent carbon, 0.032, 0.034 percent hydrogen, and 0.087, 0.089 percent nitrogen. These data indicate that the packing material contained 0.83 percent silicone polymer (calculated on the structure proposed below), or 90 percent of theoretical. Nitrogen absorption (flow method) showed that the surface area of this material was 0.44 m²/g.

Figure 7:
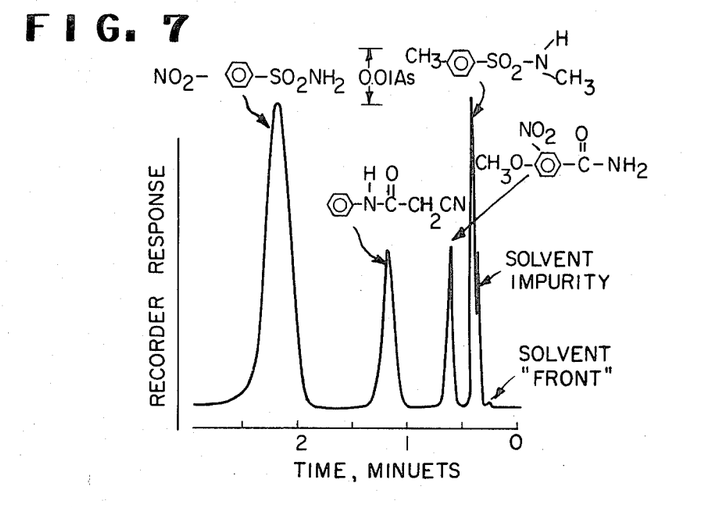
FIG. 7 is a plot of the liquid chromatographic separation with a "nitrile" bonded phase column of the present invention.

An example of the selectivity of the "nitrile" bonded-phase packing for liquid chromatography is shown in FIG. 7. This synthetic mixture of relatively insoluble substituted acetanilides and sulfonamides was separated in about 5 minutes with a high flowrate of 1:1 isopropylchloride-hexane. Use of this very polar carrier in conventional liquid-liquid chromatography is questionable because of its high mutual solubility with most liquid stationary phases. It is noteworthy that this chemically-held "nitrile" packing selectively retains compounds which can readily hydrogen-bond. Compounds with acidic -$NH_2$ groups are particularly retarded, and certain substituted phenolics, such as 4-acetamidophenol, are also highly retained.

The $\alpha$-cyanoacetanilide peak in FIG. 7 has a HETP of 1.89 mm. at a flowrate of 4.35 cc./min., which corresponds to 8.0 theoretical plates/sec. (4.8 effective plates/sec.). When operated at a carrier linear velocity of 1 cm./sec. or less, this column demonstrates HETP of less than 1 mm. for similar solutes.

The efficiency of the bonded-phase liquid chromatographic columns depends on the type and polarity of the carrier used. Columns with "nitrile" bonded-phase packing show poor efficiency with hexane as carrier. However, as the polarity of the carrier is increased, so does the efficiency of the column (equal solute partition ratios).

EXAMPLE 3

Preparation of "Ester"/"Zipax" Bonded-Phase

To a 100 ml. round-bottom flask is added 25 ml. of reagent grade dioxane, 2 ml. of 0.1N hydrochloric acid, and 4 ml. of a 70 mg./ml. solution of Union Carbide Silane A-174 ($\gamma$-methacryloxy-propyltrimethoxysilane) in dioxane. The resulting mixture is refluxed gently for 1 hour under a condenser. This hydrolysis mixture is then added to 20 grams of <400 mesh "Zipax" contained in a shallow evaporating dish, and the solvent removed while gently stirring the mixture under warm air from a heat gun. The resulting mixture is then heated for one hour at 150° C. in a circulating air oven. The treated support is then transferred to a 500 ml. round-bottom flask which contains 200 ml. of absolute methanol. The mixture is refluxed for 15 minutes, the clear solvent decanted, and this extractive technique repeated two more times with fresh 200 ml. portions of absolute methanol. After the third extraction, the material is filtered off on a sintered glass Buchner filter funnel and air-dried. The treated support is then dried to 150° C. for 30 minutes in a circulating air oven.

Elemental analysis of the "ester" bonded-phase showed carbon 0.443 percent, hydrogen 0.077 percent, indicating that 1.07 percent (96 percent of theory by carbon analysis) of the polymer phase below was present on the support. The surface area of this product by nitrogen adsorption (flow method) was 0.52 m²/g.

EXAMPLE 4

Preparation of "Ether" Bonded-Phase for Gas Chromatography 50 grams of 100–140 mesh "Zipax" (nitrogen surface area 0.46 m²/g.) is heated in a muffle furnace at 725° C. for 1 hour, then cooled in a desiccator. The resulting material is then treated with nitric acid in the manner described in Example 1, above.

To a 100 ml. round-bottom flask is added 20 ml. of reagent grade dioxane, 10 ml. of 100 mg./ml. Dow Corning Z-6040 ($\gamma$-glycidoxypropyltrimethoxysilane) and 5 ml. of 0.1N hydrochloric acid. The mixture is refluxed under a condenser for 1 hour and then added to the 100–140 mesh acid-treated "Zipax" described above. The volatile solvent is removed from the solution while stirring the mixture under warm air from a heat gun. The resulting material is heated at 150° C. for one hour in a circulating air oven. The support is then placed in a 500 ml. round-bottom flask with 200 ml. of absolute methanol and refluxed with gentle agitation for 15 minutes. The solvent is decanted and the extraction carried out twice more with fresh 200 ml. portions of absolute methanol. The thrice-extracted material is filtered off onto a sintered glass Buchner filter funnel, air-dried and then heated in a circulating air oven at 150° C. for 30 minutes. Elemental analysis of the sample showed 0.50 percent carbon, corresponding to 1.1 percent polymer on the "Zipax" surface, or 82 percent of theoretical.

Figure 8:
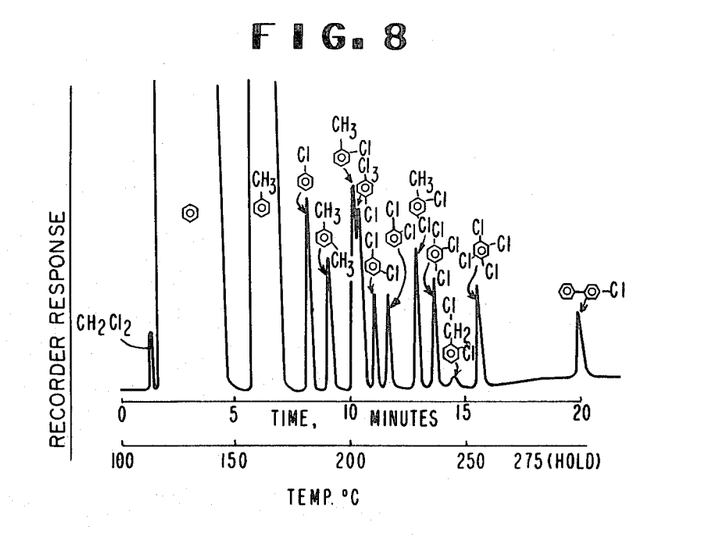
FIG. 8 is a plot showing a programmed temperature gas chromatographic separation in an "ether" bonded-phase of the present invention.

Use of the "ether" bonded-phase packing for a gas chromatographic separation is shown in FIG 8. This separation was carried out on a 1 meter × ¼ inch o.d., ⅛ inch i.d. glass column, using helium carrier gas flowrate of 50 cc./min. and a flame ionization detector sensitivity of $1 \times 10^{-9}$ amp. fullscale, with a Beckman GC-4 gas chromatograph. 0.2 Microliters of the test mixture was injected at an initial column temperature of 100° C., and the temperature of the column was continuously increased at 1.33° C. per minute. The versatility of this column permits the separation of both low boiling compounds (hexane) and very high boiling compounds (di-normal butylphthalate). The "bleed" of this "ether" bonded-phase column at high temperatures is minimal, as evidenced by the slight increase in baseline of the chromatogram approaching 300° C. for this uncompensated single column system.

Figure 9:
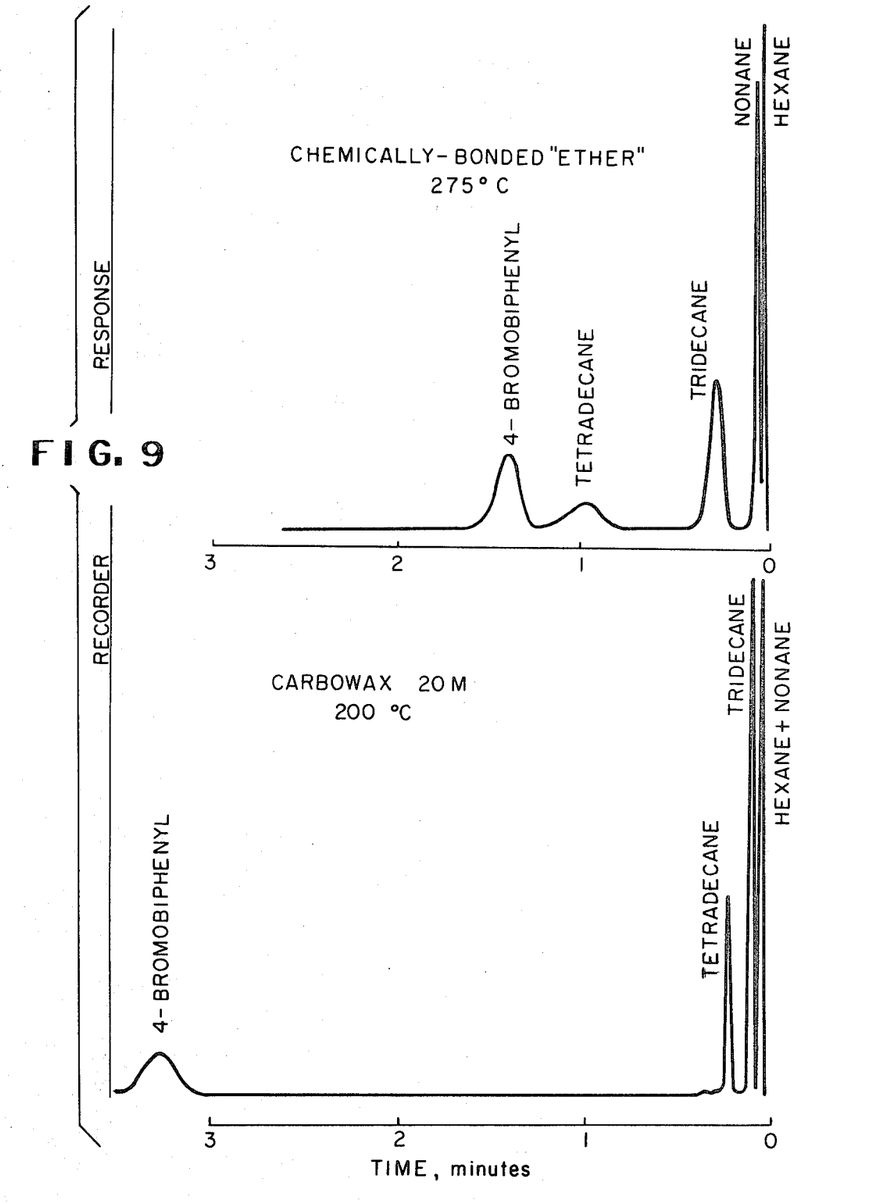
FIG. 9 compares chromatograms showing the selectivity in gas chromatography of the "ether" bonded-phase of the present invention.

The unique selectivity of the chemically-bonded polymeric "ether" packing for gas chromatographic separations is illustrated in FIG. 9. The upper curve shows the separation of a mixture of aliphatic hydrocarbons and 4-bromobiphenyl on a column of 1.1 percent bonded "ether" on "Zipax" support operated at 275° C. The lower curve is the same mixture chromatographed under identical conditions on a 1.0 percent "Carbowax" 20M (aliphatic polyether) column, except that the temperature was 200° C. The separation factors were very high for these compounds on the "ether" bonded-phase column operated at 275° C., compared to those on "Carbowax" 20M at 200° C. A similar pattern is apparent for the aromatic compound, 4-bromobiphenyl; its retention time on the "ether" column at 275° C. is 1.4 minutes, as compared to 0.25 min. for the "Carbowax" 20M column at the same temperature.

EXAMPLE 5

Preparation of "β-Cyanoethyl"/"Zipax" Bonded-Phase for Gas Chromatography

To a 100 ml. round-bottom flask is added 25 ml. of reagent grade dioxane, 2 ml. of 0.1N hydrochloric acid, and 5.0 ml. of a 70 mg./ml. solution of General Electric XC-3711 (β-cyanoethyltriethoxysilane) in dioxane. This mixture is refluxed under a condenser for 1 hour and is then added to a shallow evaporating dish containing 25 g. of 100–120 mesh acid-treated "Zipax." The solvent is removed from the mixture by stirring under a stream of warm air from a heat gun. The mixture is then heated at 150°C. for one hour in a circulating air oven. The resulting material is then extracted three times by refluxing in 300 ml. volumes of absolute methanol as described in earlier examples. Elemental analysis of the final material showed 0.205, 0.205 percent carbon, 0.025, 0.020 percent hydrogen, and 0.076, 0.071 percent nitrogen, indicating 0.72 percent polymer on the surface of the "Zipax," or 86 percent of theory.

Figure 10:
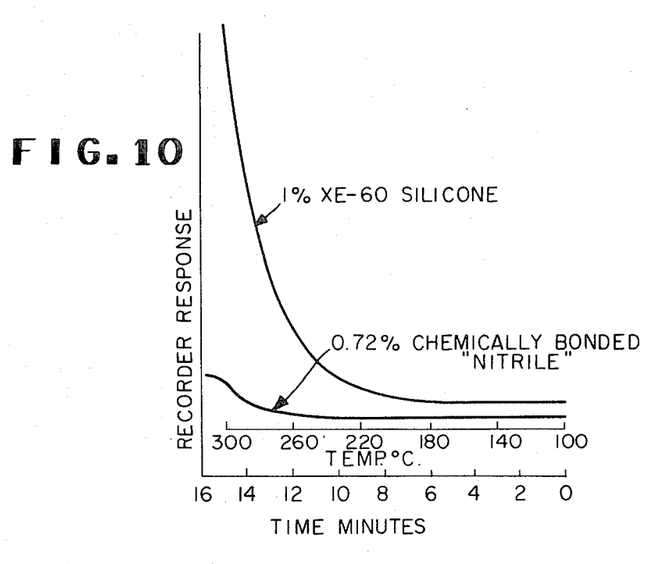
FIG. 10 is a plot showing the relative "bleed" rate of a "nitrile" stationary bonded-phase of the present invention as against a column of the prior art.

The very high temperature stability of the "β-cyanoethyl" bonded-phase packing is illustrated in FIG. 10. This figure shows the background current of a flame ionization detector operated at $1 \times 10^{-9}$ amp., full-scale, when a ¼ inch o.d. × ⅛ inch i.d. glass column of "β-cyanoethyl" bonded-phase was programmed from 100° to 300° C. On the same plot is the background current obtained under the same conditions (slightly displaced upward on the scale to show differences) for a similar column of 1 percent General Electric XE-60 (25 percent cyanoethyl, methyl silicon polymer), mechanically dispersed on 100–120 mesh "Zipax" support. Both of these columns were conditioned at 250° C. for 16 hours before this test. While the bonded "nitrile" packing shows essentially no "bleed" at 275° C., the conventional XE-60 column starts to show significant background at about 225° C. The "nitrile" column is stable to at least 300° C., while the XE-60 packing cannot be used to this temperature because of the high level of "bleed."

Figure 11:
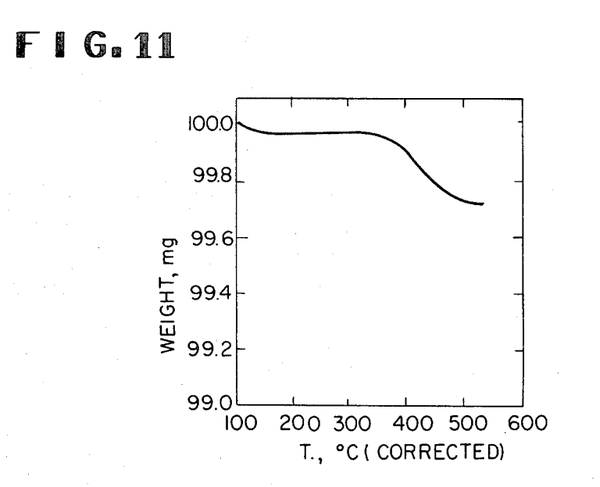
FIG. 11 is a plot of a thermograviometric curve for a chemically-bonded "nitrile" packing of the present invention.

The thermal stability of the chemically-bonded "nitrile" stationary phase is further evidenced by the thermogravimetric plot shown in FIG. 11. These data were obtained on a Du Pont Model 950 Thermogravimetric Analyser (E. I. du Pont de Nemours & Co., Inc., Wilmington, Delaware) operated at a heating rate of 10° C. per minute, using a flow of 85 cc./min. of air. The curve shows the weight loss on a 100 mg. sample of the "nitrile" material as a function of temperature. This study indicates that the organic polymeric phase is essentially stable to about 325°C., then begins to degrade slowly at higher temperatures.

The level of column "bleed" at 300° C. for the "ether" and "nitrile" bonded-phase materials is compared in Table III with conventional mechanically-held liquid phases. "Zipax" was used as the support in all measurements, and all columns were conditioned at 250° C. for 16 hours prior to taking the measurements, except "Carbowax" 20M, which was conditioned at 200° C. The selectivity of the "ether" bonded-phase packing can be roughly compared to the aliphatic polyether, "Carbowax" 20M. The data in Table III demonstrate the superior thermal stability of both "Carbowax" 20M and the "ether" bonded-phase on "Zipax" support. A similar comparison is made between the bonded "nitrile" material and silicone XE-60, a polymer containing 25 percent nitrile groupings. The superior thermal stability of the bonded polymer is apparent. An even lower level of column "bleed" occurs at a lower polymer concentration, as indicated by the data for the 0.12 percent "nitrile" polymer column.

TABLE III

"BLEED" RATES OF GAS CHROMATOGRAPHIC COLUMNS

Support - 100-140 mesh "Zipax"

| Stationary Phase | Weight Percent Loading | "Bleed" Rate at 300°C. (Amperes, full-scale) |
|---|---|---|
| "Carbowax" 20M | 1.0 | $5 \times 10^{-10}$ |
| "Ether" Bonded-phase | 1.1 | $7 \times 10^{-10}$ |
| XE-60 Silicone | 1.0 | $2 \times 10^{-9}$ |
| "Nitrile" Bonded-phase | 0.72 | $1 \times 10^{-10}$ |
| "Nitrile" Bonded-phase | 0.12 | $1 \times 10^{-11}$ |

Figure 12:
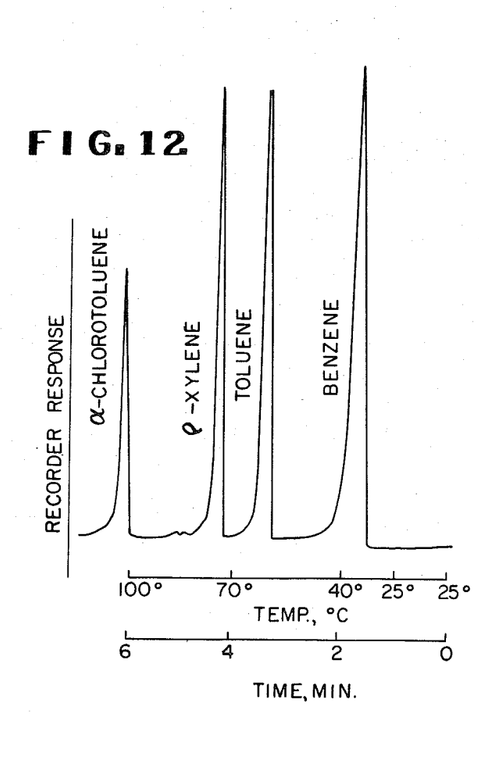
FIG. 12 is a plot of gas chromatographic separation of aromatic hydrocarbons with a "nitrile" bonded-phase.

The chemically-bonded "nitrile" stationary phase exhibits very high specific retentions for polar compounds, compared to similar conventional GC stationary phases; the elution temperatures of polar compounds chromatographed on the "nitrile" bonded-phase packing by programmed temperature gas chromatography are large. This characteristic is a function of the high polarity of the polymeric phase, and may be advantageous for carrying out certain selective separations. FIG. 12 shows the separation of a mixture of aromatic hydrocarbons carried out on a column containing only 0.12 percent "nitrile" bonded-phase on "Zipax." After sample injection, the column was held at 25° C. for 1 minute, then programmed at 15° C./min. to 100° C.

The stability of the bonded-phase packings at high temperatures makes it possible for chromatographic separations to be carried out over wide ranges in temperature without changes occurring to the column. With the use of the present invention, it is possible to prepare chromatographic phases of very high polarity which at high temperatures demonstrate a stability previously obtained only with nonpolar silicone stationary phases (polydimethylsiloxane, polymethylphenylsiloxane, etc.).

EXAMPLE 6

Ion Exchange Bonded-Phase for Liquid Chromatography 50 milliliters of a 10 percent (by weight) aqueous solution of Union Carbide A-1100 silane (γ-aminoprolyltriethoxysilane) which has been standing for 2 hours at room temperature is placed in a wide-mouthed jar with 25 grams of acid-treated "Zipax", <400 mesh. The solution is then adjusted to about pH 6 with dilute acetic acid. A vacuum (water pump) is repeatedly pulled on the solution to degas the support thoroughly and allow the solution to completely wet the support surface. The mixture is transferred to a sintered glass Buchner filter funnel and the excess solution filtered off. The moist bed is transferred to an evaporating dish and heated at 125° C. for 1 hour in a circulating air oven. The resulting sample is refluxed three times with fresh 200 ml. portions of absolute methanol, each time decanting the solvent after the treatment. The extracted beads are filtered off on a sintered glass Buchner funnel, air-dried, and then heated in a circulating air oven at 125° C. for 30 minutes.

This weak anion exchange packing can be used to separate a wide variety of acidic compounds, or other materials which are retained on this basic chromatographic medium. The amino functionality can also be quaternized to a strongly basic tetraalkylammonium derivation by well-known organic reactions. The quaternized form is a useful strong anion exchanger.

EXAMPLE 7

Bonded-Phase for Capillary Gas Chromatography

A 100 meter 0.01 inch i.d. glass capillary is cleaned by passing concentrated nitric acid through the tubing while heating over a steam bath. The capillary is then thoroughly washed with distilled water to eliminate all acid, rinsed with reagent grade acetone and dried with dry nitrogen. About 50 ml. of a 5 percent (by weight) solution of Union Carbide Silane A-16 (amyltriethoxysilane) is passed through the capillary, dry nitrogen connected to the tubing, and the excess solution removed by the pressure of the gas. The flow of dry nitrogen is continued through the capillary until all of the excess solvent has been evaporated, leaving a thin film of A-16 on the interior surface of the glass. A stream of moist air (relative humidity of about 85 percent) is then passed through the capillary until the silane ester is completely hydrolyzed, as evidenced by no more ethanol being evolved from the tubing. The capillary is then placed in a 110° C. oven and a stream of dry nitrogen slowly passed through the tubing for several hours.

This capillary bonded-phase column is particularly useful for separating complex mixtures of aliphatic and substituted aromatic hydrocarbons.

EXAMPLES 8–12

Given in Table IV are a number of bonded-phase chromatographic packings prepared by the techniques and from the reagents shown. Also given are the applications for which these systems may be used.

What is claimed is:

1. The process of producing an improved chromatographic packing with a chemically-bonded polymolecular organic stationary phase, comprising:
   a. contacting the surface of a polyvalent metal containing substrate with a solution of a polymerizable compound in a substantially non-aqueous solvent, said compound having the formula wherein $R_3'$ is a hydroxyl or a monovalent aliphatic or aromatic hydrocarbon radical, $R_4$ is a monovalent aliphatic or aromatic hydrocarbon
said solvent being substantially inert to said substrate, at least a portion of said surface containing -OH groups attached to said metal, said metal having a valence of 3–5. said solution being acidic or basic and containing less water than about 100 times the equivalents of said compound in said solution;
   b. heating said compound in said solvent to at least initiate polymerization of said compound; and
   c. heating said partially polymerized compound while in said solvent in contact with said surface to chemically bond said compound to the metal of said surface and to further polymerize said compound.

2. The process of producing an improved chromatographic packing with a chemically-bonded polymolecular stationary phase comprising:
   a. heating a solution of a polymerizable compound in a substantially non-aqueous solvent, said compound having the formula wherein $R_3'$ is a hydroxyl or a monovalent aliphatic or aromatic hydrocarbon radical, $R_4$ is a monovalent aliphatic or aromatic hydrocarbon radical, said solvent being substantially inert to said substrate, said solution being acidic or basic and containing less water than about 100 times the equivalents of said polymerizable compound in said solution, whereby polymerization of said polymerizable compound is at least initiated;

TABLE IV

| Example | Support | Reagent | % Polymer by weight | Application of Permaphase Packing |
|---|---|---|---|---|
| 8 | "Chromosorb" W, 100–200 mesh (Johns-Mansville Corp., diatomaceous earth) | phenyltriethoxysilane | 5.0 | High temperature gas chromatography |
| 9 | Silica Gel, 37–44 μ (Davidson Chemical Co., Type 62) | β-(3,4-epoxycyclohexyl)-ethyldimethoxysilane | 10.0 | Adsorption-partition liquid chromatography |
| 10 | Stainless Steel Capillary 1/16" o.d., 0.010" i.d. | dimethyldiethoxysilane | Approx. 0.5 μ film | Capillary gas chromatography |
| 11 | "Textured" Glass Beads 44–63 μ (Corning Glass) | 3-chloropropyltrimethoxysilane | 0.75 | Partition liquid chromatography |
| 12 | "Zipax" (E. I. du Pont de Nemours & Co.) | L-(+)-p-[5-(methoxycarbonyl)-5-aminopent-1-yl-sulfamoyl]-phenyl-trimethoxysilane | 1.0 | Liquid chromatographic separation of optically active isomers |
| 13 | Silica Gel, 5–10μ ("Camag") | gamma-glycydoxypropyl-trimethoxysilane | 10.0 | Liquid partition thin layer chromatography | b. contacting the surface of a silica-containing substrate with the solution containing said partially polymerized compound, at least a portion of said surface containing groups; and c. further heating said solution while in contact with said surface to chemically bond said compound to the silica of said substrate and to further polymerize said compound.

3. The process of producing an improved chromatographic packing with a chemically-bonded polymolecular stationary phase comprising:

a. contacting the surface of a silica-containing substrate with a solution of a polymerizable compound in a solvent, said compound having the formula wherein $R_3'$ is a hydroxyl or a monovalent aliphatic or aromatic hydrocarbon radical, $R_4$ is a monovalent aliphatic or aromatic hydrocarbon, said solvent being substantially inert to said substrate, at least a portion of said surface containing groups, said solution being acidic or basic;

b. removing a major portion of said solvent of said solution while said solution is in contact with said surface to provide a damp surface, said compound being located in the proximity of said surface and at least a portion of said compound contacting said surface;

c. heating said compound while in proximity to said substrate to a temperature below 100°C., to prepolymerize said compound; and d. heating said partially polymerized compound while in proximity to said surface to chemically bond said compound to the silica of said substrate and to further polymerize said compound.

4. The process of claim 2 wherein prior to heating said solution of said polymerizable compound, said polymerizable compound is formed by heating a solution of a reagent compound dissolved in said substantially non-aqueous solvent, said reagent compound having the formula wherein $R_1$ and $R_2$ are alkoxyl and $R_3$ is $R_3'$ or alkoxyl said solution containing said reagent compound being acidic or basic and containing a quantity of water which is from one third to about 100 times the equivalents of said reagent compound.

5. The process of claim 4 wherein said non-aqueous solvent is an ether.

6. The process of claim 5 wherein said ether is tetrahydrofuran or dioxane.

7. The process of claim 6 wherein said substrate comprises silica particles or gel.

8. The process of claim 7 wherein prior to heating said solution whereby polymerization of said polymerizable compound is at least initiated, the pH of said solution is adjusted to a value within the range of about 3 to 6.

9. The process of claim 8 wherein acetic acid is added to adjust the pH to within said range.

10. The process of claim 8 wherein $R_1$ and $R_2$ are the same.

11. The process of claim 10 wherein $R_3$ is the same as $R_1$ and $R_2$.

12. The process of claim 4 wherein $R_1$ and $R_2$ are selected from the group consisting of -OCH$_3$, -OC$_2$H$_5$, -OC$_2$H$_4$OCH$_3$, and -OOCCH$_3$.

13. The process of claim 8 wherein said compound is selected from the group consisting of gamma-glycidoxypropyltrimethoxysilane, beta-(3,4-epoxycyclohexyl)-ethyltrimethoxysilane, gamma-aminopropyl triethoxysilane, N-beta-(aminoethylgamma-amino)-propyltrimethoxysilane, gamma-methacryloxypropyltrimethoxysilane, methyltriethoxysilane, phenyltriethoxysilane, amyltriethoxysilane, methyltrimethoxysilane, diphenyldiethoxysilane, 3-chloropropyl-trimethoxysilane, beta-cyanoethyltriethoxysilane, and beta-cyanoethyl-methyldiethoxysilane.

14. The process of claim 4 wherein $R_1$, $R_2$ and $R_3$ of a first portion of said reagent compound are alkoxyl, and $R_1$ and $R_2$ of a second portion of said reagent compound are alkoxyl and $R_3$ of said second portion is neither a hydroxyl nor alkoxyl.

15. The process of claim 2 wherein subsequent to said further heating, said $R_1$ is further chemically reacted.

16. An improved chromatographic packing comprising a polyvalent metal-containing substrate and a stationary phase, said stationary phase comprising a polymer being sufficiently porous to allow penetration by a carrier fluid and the material contained therein, said polymer having the repeating unit of the formula wherein A is -O- or a monovalent aliphatic or aromatic hydrocarbon radical and R is a monovalent aliphatic or aromatic hydrocarbon radical, said metal of said substrate having a valence of 3–5, said stationary phase being chemically bonded to the surface of said substrate by an linkage, wherein M is said polyvalent metal and is part of one of said repeating units of said stationary phase, said stationary phase having an average thickness of about from 30A to 10,000A, said polymer comprising 5 to 80 percent of the volume of said stationary phase.

17. The packing of claim 16 wherein said metal is silicon.

18. The packing of claim 17 wherein A is -O-.

19. The packing of claim 17 wherein A is a monovalent aliphatic or aromatic hydrocarbon radical.

20. The packing of claim 17 wherein said stationary phase comprises at least two copolymerized portions.

21. The packing of claim 20 wherein A in the first of said portions is -O-, and A in thhe second of said portions is a monovalent aliphatic or aromatic hydrocarbon radical.

22. The packing of claim 16 wherein said substrate comprises silica gel or silica-containing particles.

23. The packing of claim 22 wherein A is -O- and R is selected from the group consisting of gamma-glycidoxypropyl, beta-(3,4-epoxycyclohexyl)-ethyl, gamma-aminopropyl, N-beta-(aminoethyl-gamma-amino)-propyl, gamma-methacryloxypropyl, methyl, phenyl, amyl, 3-chloropropyl, and beta-cyanoethyl.

24. The packing of claim 22 wherein A is methyl or phenyl and R is phenyl or beta-cyanoethyl.

25. The packing of claim 16 wherein said stationary phase has an average thickness of about from 50 A° to 2,000 A°.

26. The packing of claim 16 wherein said polymer comprises 25 to 65 percent of the volume of said stationary phase.

* * * * *